(12) United States Patent
Bullman et al.

(10) Patent No.: US 7,081,727 B1
(45) Date of Patent: Jul. 25, 2006

(54) REGENERATIVE CHARGING FOR PORTABLE ELECTRONIC DEVICES

(75) Inventors: William R. Bullman, Macungie, PA (US); Steven E. Strauss, Orefield, PA (US)

(73) Assignee: Agere Systems Inc., Allentown, PA (US)

( * ) Notice: Subject to any disclaimer, the term of this patent is extended or adjusted under 35 U.S.C. 154(b) by 0 days.

(21) Appl. No.: 11/168,790

(22) Filed: Jun. 28, 2005

(51) Int. Cl.
*H02P 3/14* (2006.01)

(52) U.S. Cl. ............... 318/376; 318/139; 318/440; 318/411

(58) Field of Classification Search ......... 318/376, 318/139, 109, 590, 500, 442, 440, 441
See application file for complete search history.

(56) References Cited

U.S. PATENT DOCUMENTS

| | | | |
|---|---|---|---|
| 6,094,020 A * | 7/2000 | Goretzki et al. | 318/109 |
| 2002/0097013 A1 * | 7/2002 | Bedini | 318/139 |

* cited by examiner

*Primary Examiner*—Karen Masih

(57) ABSTRACT

In a portable electronic device having a data-storage drive that employs a rotatable data-storage carrier, as the data-storage carrier undergoes spin-up and spin-down cycles when the data-storage drive is being accessed, the electronic device recaptures at least a portion of the kinetic energy of the rotating data-storage carrier during the spin-downs to generate electrical currents and use them to either charge the battery or reduce the battery drain.

22 Claims, 4 Drawing Sheets

REGENERATIVE CHARGING FOR PORTABLE ELECTRONIC DEVICES

BACKGROUND OF THE INVENTION

1. Field of the Invention

The present invention relates to regenerative charging techniques for portable electronic devices having a battery and a rotatable media-storage carrier.

2. Description of the Related Art

Extending battery life in portable and embedded electronic devices is important for reducing operation costs and improving convenience for end-users of such devices. However, methods for achieving the same are typically device-specific and, for many device types, are not yet sufficiently developed.

SUMMARY OF THE INVENTION

In a portable electronic device having a data-storage drive that employs a rotatable data-storage carrier, as the data-storage carrier undergoes spin-up and spin-down cycles when the data-storage drive is being accessed, the electronic device recaptures at least a portion of the kinetic energy of the rotating data-storage carrier during the spin-downs to generate electrical currents and use them to either charge the battery or reduce the battery drain. As a result, battery life can advantageously be extended.

According to one embodiment, the present invention is a device, comprising: a data-storage drive, wherein the data-storage drive comprises a motor having a rotor and a plurality of stator coils adapted to be powered by a battery; and a device controller adapted to disconnect the stator coils from the battery using a first switch circuit, wherein: if the rotor is spinning and the stator coils are disconnected from the battery, the rotor produces an electromotive force (EMF), which induces electrical currents in the stator coils; and the device is adapted to use the induced electrical currents to supplement power of the battery.

According to another embodiment, the present invention is a method of generating electrical power, comprising: (A) spinning up a rotor in a motor of a data-storage drive, wherein the motor comprises a plurality of stator coils adapted to be powered by a battery; (B) disconnecting the stator coils from the battery using a first switch circuit, wherein the spinning rotor produces an EMF, which induces electrical currents in the stator coils; and (C) using the induced electrical currents to supplement power of the battery.

According to yet another embodiment, the present invention is a device, comprising: a stepper motor having a rotor and a plurality of stator coils; and a device controller adapted to controllably connect the stator coils to a power source to produce rotation of the rotor, wherein: if the rotor is rotating and the stator coils are disconnected from the power source, then the rotor produces an EMF, which induces electrical currents in the stator coils; and the device controller is adapted to controllably connect the stator coils to an energy-storage device to store energy of the induced electrical currents in said energy-storage device.

BRIEF DESCRIPTION OF THE DRAWINGS

Other aspects, features, and benefits of the present invention will become more fully apparent from the following detailed description, the appended claims, and the accompanying drawings in which:

DETAILED DESCRIPTION

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments.

Figure 1:
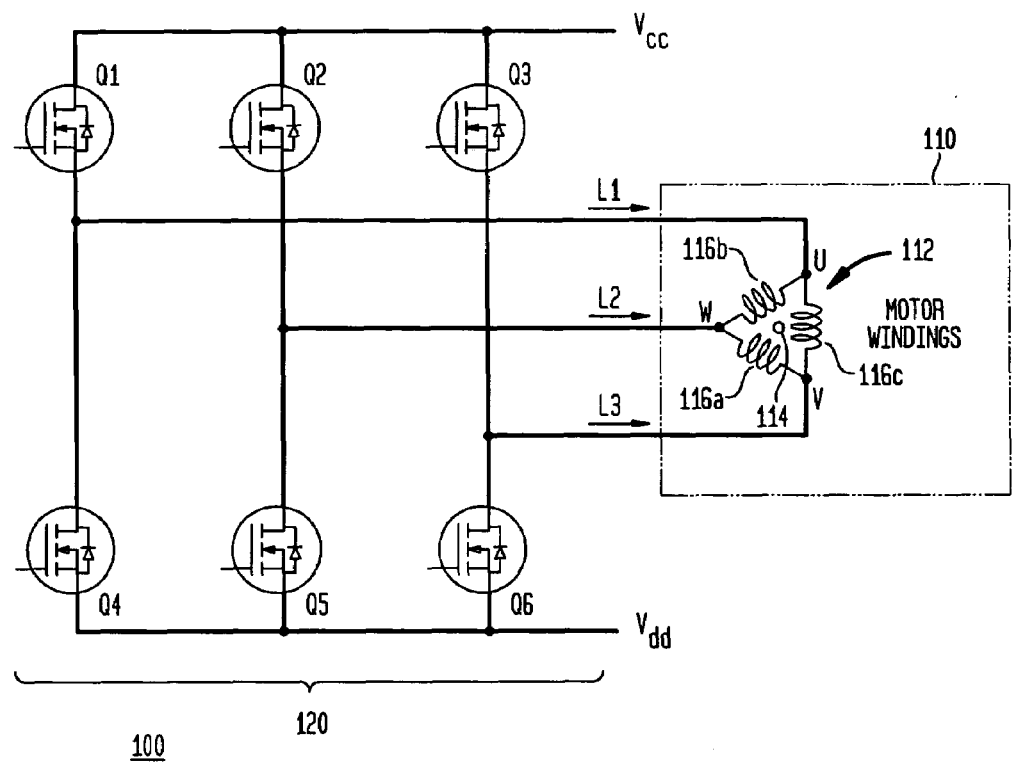
FIG. 1 schematically shows a prior-art device having a hard-disk drive (HDD)

FIG. 1 schematically shows a prior-art device 100 having a hard-disk drive (HDD) 110. HDD 110 has a motor 112, with a data storage disk (not shown) mounted on a rotor 114 of the motor. In addition to rotor 114, motor 112 has a stator 116 having three stator coils (motor windings) 116a–c. A switch circuit 120 connects stator coils 116a–c to a power supply (represented in FIG. 1 by power lines labeled $V_{cc}$ and $V_{dd}$) such that a rotating magnetic field can be created in the inner cavity of the stator. Rotor 114 has a permanent magnet (not shown), which is forced by the rotating magnetic field to rotate together with the field, thereby rotating the rotor.

Switch circuit 120 has six switches labeled Q1–Q6, each switch having a FET transistor and a diode connected in parallel with the transistor. Each transistor can be turned ON or OFF by a device controller (not shown), which applies an appropriate control voltage to the transistor gate. Each diode serves a protective function, which is explained in more detail below.

Figure 2:
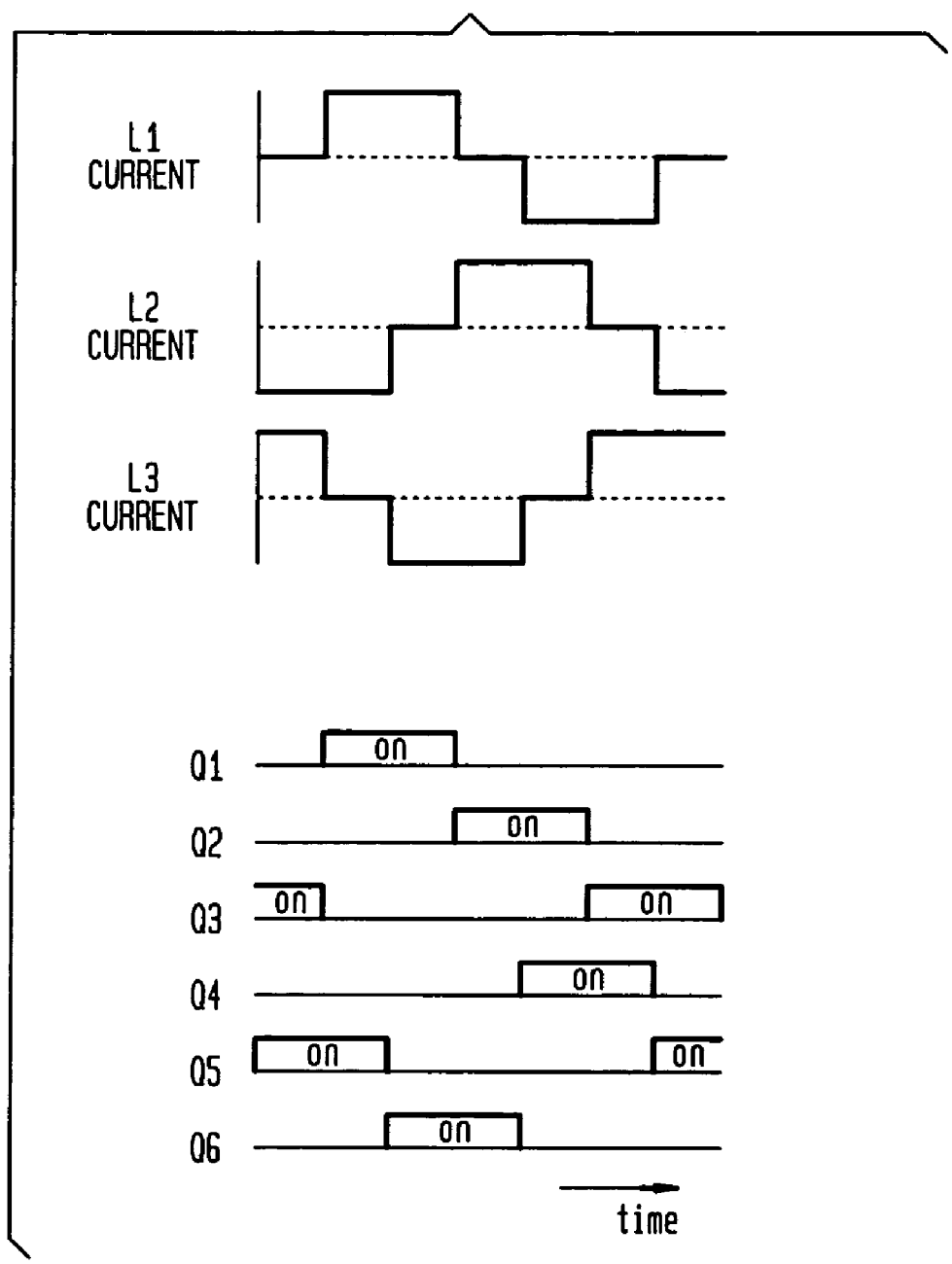
FIG. 2 graphically illustrates how the switch circuit in the device of FIG. 1 operates to produce rotation of the rotor in the HDD.

FIG. 2 graphically illustrates how switch circuit 120 operates to produce (clockwise in FIG. 1) rotation of rotor 114. Switches Q1–Q6 are turned ON and OFF in a staggered fashion such that, at any given time, only one of switches Q1, Q2, and Q3 is ON and only one of switches Q4, Q5, and Q6 is ON, as indicated by the bottom six traces in FIG. 2. More specifically, the following cyclical sequence of ON states is implemented: (Q3, Q5); (Q5, Q1); (Q1, Q6); (Q6, Q2); (Q2, Q4); (Q4, Q3). This cyclical sequence generally corresponds to six angular phases of motor 112, where each angular phase is defined by the orientation of the magnetic vector (i.e., the vector connecting the south and north poles of the permanent magnet) of rotor 114 with respect to stator coils 116a–c. More specifically, each angular phase is represented by a 60-degree sector, with the six sectors representing six different angular phases of motor 112 taken together forming a full circle. It is generally said that motor 112 is in a particular angular phase, when the magnetic-vector direction for rotor 114 is within the boundaries of the corresponding 60-degree sector. During steady rotation of rotor 114, all angular phases have the same duration.

In the above-indicated sequence of states, at any given time, only one of the three coils in stator 116 is active (i.e., draws current from the power supply), while the other two coils are idle. In addition, for each stator coil, the direction of the current changes from one period of activity to the next. For example, the above-indicated sequence results in the following sequence of active stator coils: 116a, 116b, 116c, 116a, 116b, 116c. Note that, in this sequence, when stator coil 116a is activated by switches Q3 and Q5, the current flows from terminal "v" to terminal "w". However, when stator coil 116a is activated (the next time in the sequence) by switches Q2 and Q6, the current has an opposite polarity and flows from terminal "w" to terminal "v".

The permanent magnet of rotor 114 interacts with an active stator coil such that the north (south) pole of the rotor is attracted to the south (north) pole of the coil. This interaction causes rotor 114 to rotate in the direction of proper magnetic-vector alignment. However, as illustrated in FIG. 2, when rotor 114 rotates by about 60 degrees, switch circuit 120 idles the presently active coil and activates the next coil, thereby changing the alignment direction and producing clockwise rotation of the rotor. It is clear from the above description that the rotation speed (usually measured in revolutions per minute, rpm) can be changed by appropriately changing the angular phase duration. For example, to change the rotation speed of rotor 114 from 1,000 to 2,000 rpm, the angular phase duration is changed from about 10 ms to about 5 ms.

To read data from or write data to the storage disk of HDD 110, the device controller spins up motor 112 to a steady rotation state, positions the HDD transducer (read/write) head(s) for accessing appropriate tracks on the disk, and performs the required read and/or write operation. After the read/write operation is completed, the device controller brakes and stops the disk. Typically, during this braking and stopping, all switches in switch circuit 120 are turned OFF and a mechanical or electrical brake is applied to rotor 114. However, before rotor 114 comes to a complete stop, the angular momentum (kinetic energy) of the rotating rotor (and the storage disk) causes motor 112 to continue to rotate, thereby generating a reverse electromotive force (EMF). The diodes in switches Q1–Q6 of switch circuit 120 protect the FET transistors of these switches from damage by the currents generated by the reverse EMF by bleeding these currents back into the motor windings and the associated HDD electronics, where the energy of these currents is dissipated into heat. Typically, the device controller is configured to apply the mechanical or electrical brake so as to stop the rotor as quickly as possible to reduce the energy generated by the reverse-EMF and prevent possible damage to the motor windings and/or the associated electronics. The action of the mechanical or electrical brake likewise produces heat that is dissipated into the surroundings.

To save power, device 100 is typically configured to spin up HDD 110, read or write a section of data, and initiate a spin-down, thereby reducing the battery drain by not rotating rotor 114 continuously. As a result, HDD 110 undergoes numerous spin-up and spin-down cycles when the storage disk of the HDD is being accessed. While some energy is indeed saved on rotation, a substantial amount of energy might still be dissipated into heat as described above and lost. Instead of wasting all this energy, embodiments of the present invention recapture at least a portion of the kinetic energy of the rotor during spin-downs to generate electricity and use it to either charge the battery or reduce the battery drain by contributing runtime current to other circuits. As a result, battery life can advantageously be extended.

Figure 3:
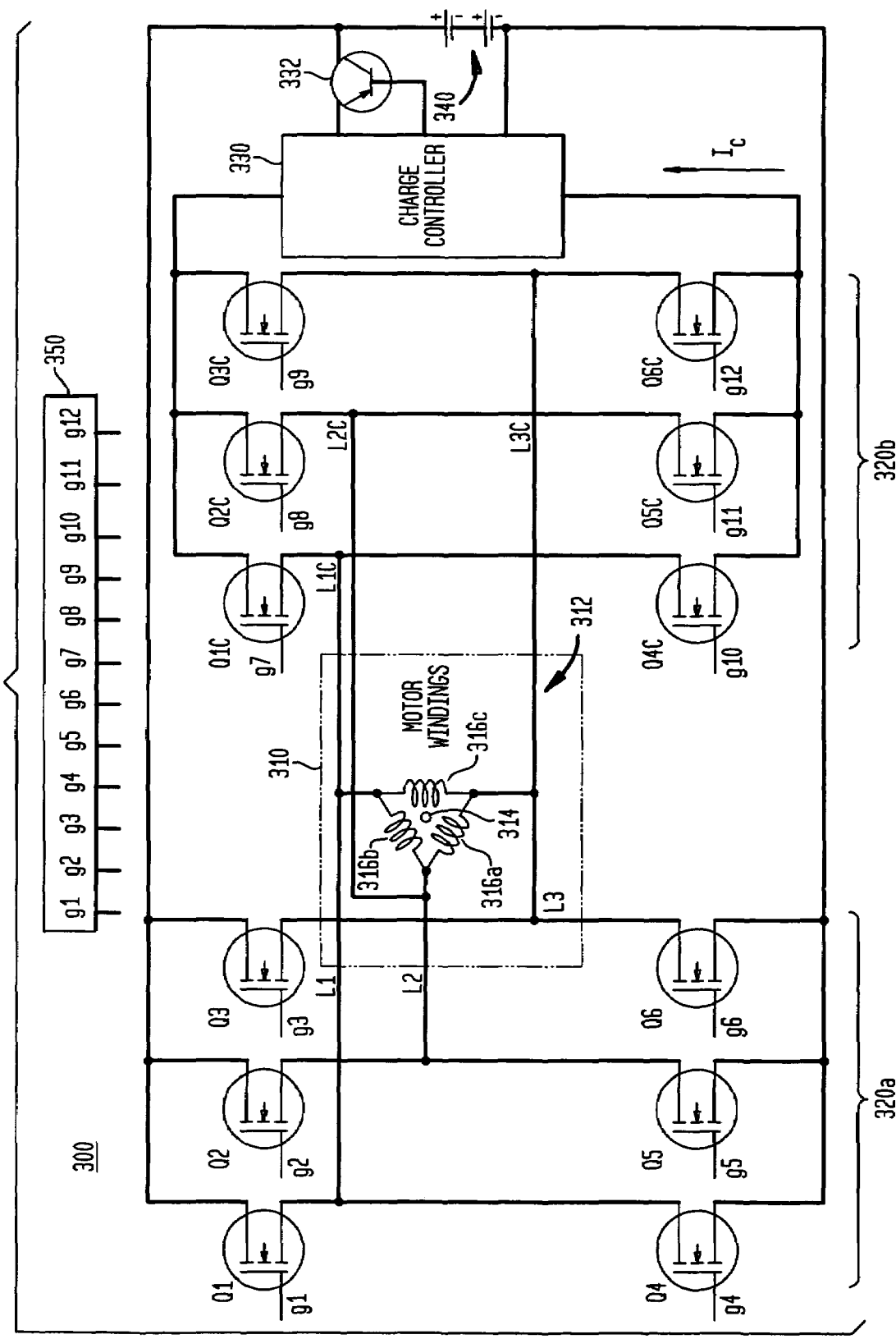
FIG. 3 schematically shows a device having an HDD according to one embodiment of the invention.

FIG. 3 schematically shows a device 300 having an HDD 310 according to one embodiment of the invention. HDD 310 is generally analogous to HDD 110 of FIG. 1 and has a motor 312, with a data storage disk (not shown) mounted on a rotor 314 of the motor. Motor 312 has three stator coils (motor windings) 316a–c, and two switch circuits 320a–b connect the stator coils to a battery 340 and a charge controller 330, respectively. Battery 340 is a rechargeable battery, and charge controller 330 is configured to provide the battery with a charging voltage/current. Each of switch circuits 320a–b has six switches labeled Q1–Q6 and Q1C–Q6C, respectively. Note that each switch in switch circuits 320a–b has a FET transistor, but, unlike the switches in switch circuit 120 (FIG. 1), does not have a diode connected in parallel with the transistor. Each transistor in switch circuits 320a–b can be turned ON or OFF by a device controller 350, which applies an appropriate control voltage to the transistor gate (labeled g1–g12 in FIG. 3).

Figure 4A:
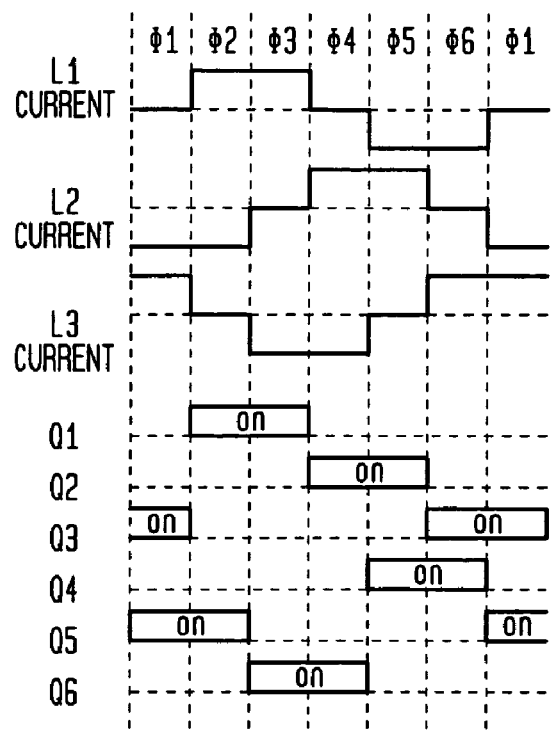
FIGS. 4A–B graphically illustrate switching sequences and coil currents in the device of FIG. 3 according to one embodiment of the invention.
Figure 4B:
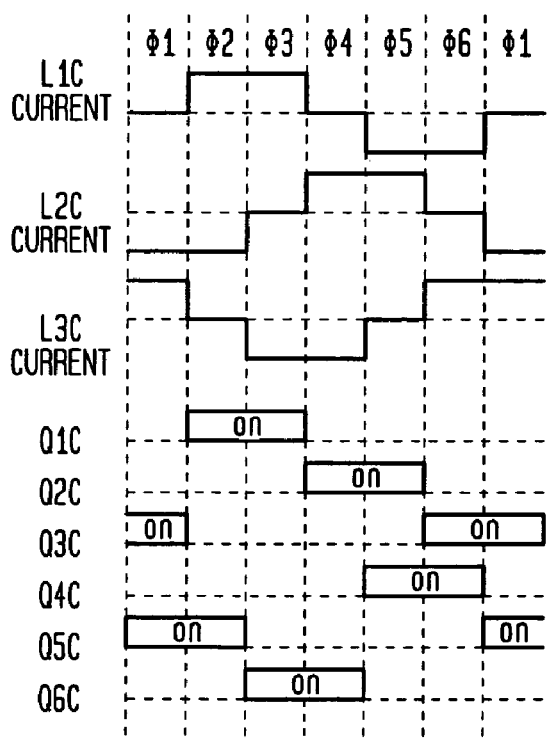

FIGS. 4A–B graphically illustrate (i) coil currents in stator 316 and (ii) switching sequences in switch circuits 320a–b of device 300 according to one embodiment of the invention. More specifically, FIG. 4A shows (i) currents on lines L1–L3 of FIG. 3 and (ii) the states of switches Q1–Q6 during spin-up and steady (clockwise in FIG. 3) rotation of rotor 314, and FIG. 4B shows (i) currents on lines L1C–L3C of FIG. 3 and (ii) the states of switches Q1C–Q6C during the rotor spin-down.

Referring to FIG. 4A, switches Q1C–Q6C of switch circuit 320b are OFF, and switches Q1–Q6 of switch circuit 320a are turned ON and OFF in a staggered fashion similar to that shown in FIG. 2. More specifically, during the six angular phases ($\phi 1$–$\phi 6$) of motor 312, the following switches are ON: $\phi 1$:(Q3, Q5); $\phi 2$:(Q5, Q1); $\phi 3$:(Q1, Q6); $\phi 4$:(Q6, Q2); $\phi 5$:(Q2, Q4); $\phi 6$:(Q4, Q3). The permanent magnet of rotor 314 interacts with stator coils 316a–c in a manner similar to the above-described manner of interaction of rotor 114 with stator coils 116a–c. This interaction produces clockwise rotation of rotor 314.

Referring to FIG. 4B, when HDD data operations have ceased and the storage disk can be stopped, device controller 350 turns OFF switches Q1–Q6 of switch circuit 320a, thereby disconnecting motor 312 from battery 340, but, unlike the prior-art device 100, does not apply a mechanical brake to rotor 314. Despite the removed power, the angular momentum of rotor 314 (and the storage disk) causes the rotor to continue to spin and move its permanent magnet past stator coils 316a–c. This motion modulates the magnetic flux in the stator coils and produces reverse EMF. The reverse EMF, in turn, produces currents in the motor windings, which create magnetic fields that interact with the permanent magnet of rotor 314 such as to slow down and eventually stop the rotor. These currents also appear on lines L1C–L3C and are indicated by the upper three traces in FIG. 4B.

To harness the currents generated by the reverse EMF, device controller 350 turns ON switches Q1C–Q6C of switch circuit 320b as shown by the bottom six traces in FIG. 4B. More specifically, during angular phases $\phi 1$–$\phi 6$ of motor 312, the following switches are ON: $\phi 1$:(Q3C, Q5C); $\phi 2$:(Q5C, Q1C); $\phi 3$:(Q1C, Q6C); $\phi 4$:(Q6C, Q2C); $\phi 5$:(Q2C, Q4C); $\phi 6$:(Q4C, Q3C). Due to this switching sequence, switch circuit 320b transforms the alternating currents generated by the reverse EMF in stator coils 316a–c into a unidirectional charging current, $I_c$, and applies this charging current to charge controller 330. In the embodiment shown in FIG. 3, charge controller 330 then uses current $I_c$ to generate a suitable electrical output for (re)charging battery 340 through transistor 332.

As rotor 314 slows down, the angular phase duration increases accordingly. Device controller 350 is configured to time the sequence of FIG. 4B so as to take into account the lengthening of the angular phases. In one embodiment, device controller 350 is configured to adjust the timing of the sequence based on the measured rotation speed of rotor 314 as provided by an rpm sensor or a feedback signal from a motor-speed controller. Alternatively, for a disk/rotor assembly with known spin-down characteristics, device controller 350 may be preprogrammed to change the timing based on those characteristics.

While this invention has been described with reference to illustrative embodiments, this description is not intended to be construed in a limiting sense. For example, although embodiments of the present invention are described in reference to devices having HDDs, this invention is similarly applicable to any electronic device having a stepper motor that is not necessarily coupled to a data-storage application, which motor is configured to undergo spin-ups and spin-downs when the device is operated. In one embodiment, a stepper motor is configured to (i) be powered by a suitable power source, which is not necessarily a battery, and (ii) when disconnected from that power source, couple the energy of the reverse EMF to a suitable energy-storage device, e.g., a smoothing capacitor. In the context of data-storage applications, embodiments of the invention can be applied to a device having a data-storage drive with any suitable rotating media- or data-storage carriers such as CDs, DVDs, mini-disks, etc. One skilled in the art will appreciate that embodiments of the present invention can be used with motors having any number of stator coils. More specifically, a device having six independent stator coils in its motor will have two switch circuits analogous to switch circuits 320*a*–*b* of FIG. 3, with each switch circuit having 12 switches. In general, a device of the invention, which has N independent stator coils in its motor, will have 2N switches in each of its two switch circuits analogous to circuits 320*a*–*b* of FIG. 3. In one embodiment, an additional switch may be inserted between switch circuit 320*a* and battery 340 such that opening that additional switch would disconnect stator coils 316*a*–*c* from the battery regardless of the states of the switches in switch circuit 320*a*. Although embodiments of the present invention are described in reference to a device having a motor with its stator coils connected in a circular arrangement, this invention can similarly be used in a device having a motor with the stator coils connected in a star arrangement. A representative device having star-connected stator coils is disclosed in U.S. Pat. No. 6,094,020, the teachings of which are incorporated herein by reference. In addition to or instead of regenerative braking described above in the context of FIG. 4B, a device of the invention can be configured to apply a conventional mechanical brake, if appropriate or necessary, to shorten the rotor deceleration time. Various modifications of the described embodiments, as well as other embodiments of the invention, which are apparent to persons skilled in the art to which the invention pertains are deemed to lie within the principle and scope of the invention as expressed in the following claims.

Although the steps in the following method claims, if any, are recited in a particular sequence with corresponding labeling, unless the claim recitations otherwise imply a particular sequence for implementing some or all of those steps, those steps are not necessarily intended to be limited to being implemented in that particular sequence.

What is claimed is:

1. A device, comprising:
 a data-storage drive comprising a motor having a rotor and a plurality of stator coils adapted to be powered by a battery; and
 a device controller adapted to disconnect the stator coils from the battery using a first switch circuit, wherein:
   if the rotor is spinning and the stator coils are disconnected from the battery, then the rotor produces an electro-motive force (EMF), which induces electrical currents in the stator coils;
   the device is adapted to use the induced electrical currents to supplement power of the battery;
   the device controller is further adapted to connect the stator coils to a charge controller using a second switch circuit; and
   the charge controller is adapted to receive the induced electrical currents and, based on said currents, to produce an electrical output that supplements the power of the battery.

2. The invention of claim 1, wherein the data-storage drive is a hard-disk drive.

3. The invention of claim 1, wherein the charge controller is adapted to use the electrical output to charge the battery.

4. The invention of claim 1, wherein:
 the plurality of stator coils comprises N stator coils, where N is a positive integer greater than two;
 the second switch circuit comprises 2N switches adapted to connect the N stator coils to the charge controller; and
 the device controller is adapted to control each of the 2N switches of the second switch circuit to connect the N stator coils to the charge controller in a desired sequence such that the charge controller receives from the N stator coils a substantially unidirectional current.

5. The invention of claim 4, wherein:
 the first switch circuit comprises 2N switches adapted to connect the N stator coils to the battery; and
 the device controller is adapted to control each of the 2N switches of the first switch circuit to connect the N stator coils to the battery in a desired sequence to cause the rotor to spin.

6. The invention of claim 5, wherein each of the 2N switches in the first switch circuit consists of a transistor.

7. The invention of claim 5, wherein each of the 2N switches in the first switch circuit does not have a diode adapted to protect the switch from damage by the induced electrical currents.

8. The invention of claim 4, wherein the three stator coils are connected to one another in a circular arrangement.

9. The invention of claim 4, wherein the device controller is adapted to time said sequence based on rotation speed of the rotor.

10. The invention of claim 1, further comprising the battery.

11. A method of generating electrical power, comprising:
 (A) spinning up a rotor in a motor of a data-storage drive, wherein the motor comprises a plurality of stator coils adapted to be powered by a battery;
 (B) disconnecting the stator coils from the battery using a first switch circuit, wherein the spinning rotor produces an electromotive force (EMF), which induces electrical currents in the stator coils;
 (C) using the induced electrical currents to supplement power of the battery; and
 (D) connecting the stator coils to a charge controller using a second switch circuit, wherein the charge controller is adapted to receive the induced electrical currents and, based on said currents, to produce an electrical output that supplements the power of the battery.

12. The invention of claim 11, wherein, for step (B), the induced electrical currents cause the rotor to decelerate.

13. The invention of claim 12, wherein step (B) comprises stopping the rotor.

14. The invention of claim 11, wherein step (A) comprises accessing the data-storage drive to perform a data operation.

15. The invention of claim 11, wherein step (C) comprises using the electrical output to charge the battery.

16. The invention of claim 11, wherein:
the plurality of stator coils comprises N stator coils, where N is a positive integer greater than two;
the second switch circuit comprises 2N switches adapted to connect the N coils to the charge controller; and
the method comprises configuring the 2N switches of the second switch circuit to connect the N stator coils to the charge controller in a desired sequence such that the charge controller receives from the N stator coils a substantially unidirectional current.

17. The invention of claim 16, wherein:
the first switch circuit comprises 2N switches adapted to connect the N stator coils to the battery; and
step (A) comprises configuring the 2N switches of the first switch circuit to connect the N stator coils to the battery in a desired sequence to cause the rotor to spin.

18. The invention of claim 16, wherein the step of configuring the 2N switches comprises timing said sequence based on rotation speed of the rotor.

19. A device, comprising:
a stepper motor having a rotor and a plurality of stator coils; and
a device controller adapted to controllably disconnect the stator coils from a power source using a first switch circuit, wherein:
if the rotor is rotating and the stator coils are disconnected from the power source, then the rotor produces an electromotive force (EMF), which induces electrical currents in the stator coils;
the device controller is adapted to controllably connect the stator coils to a charge controller using a second switch circuit; and
the charge controller is adapted to receive the induced electrical currents and, based on said currents, to produce an electrical output that is applied to an energy-storage device to store energy of the induced electrical currents in said energy-storage device.

20. The invention of claim 19, wherein the device is a portable electronic device.

21. The invention of claim 19, further comprising a data-storage drive, wherein the motor is adapted to rotate a data-storage carrier of said data-storage drive.

22. The invention of claim 19, wherein the energy-storage device comprises a battery.

* * * * *